United States Patent [19]
Murakami

[11] Patent Number: 5,689,582
[45] Date of Patent: Nov. 18, 1997

[54] IMAGE PROCESSING APPARATUS HAVING IMAGE REGION DESIGNATING FUNCTION

[75] Inventor: Naoya Murakami, Yokohama, Japan

[73] Assignee: Kabushiki Kaisha Toshiba, Kawasaki, Japan

[21] Appl. No.: 593,947

[22] Filed: Jan. 30, 1996

[30] Foreign Application Priority Data

Feb. 3, 1995 [JP] Japan ..................... 7-017184

[51] Int. Cl.⁶ ............... H04N 1/40; H04N 1/38; H04N 1/387; G06K 9/34
[52] U.S. Cl. ............ 382/176; 358/462; 358/452; 358/453; 358/447; 358/463; 358/465; 382/173; 382/176; 382/199; 382/258; 382/266; 382/254; 382/270
[58] Field of Search ................ 358/464, 462, 358/453, 452, 456, 447, 445, 451, 463, 465; 382/173, 176, 199, 258, 266, 290, 270, 254

[56] References Cited

U.S. PATENT DOCUMENTS

| 4,853,970 | 8/1989 | Ott et al. ................. 382/254 |
| 4,893,188 | 1/1990 | Murakami et al. ......... 358/456 |
| 5,257,116 | 10/1993 | Suzuki ..................... 358/465 |
| 5,363,210 | 11/1994 | Sasaki et al. ............. 358/448 |
| 5,488,673 | 1/1996 | Katayama et al. ......... 382/270 |
| 5,532,828 | 7/1996 | Mitsuse ................... 358/298 |
| 5,568,571 | 10/1996 | Willis et al. .............. 382/254 |

FOREIGN PATENT DOCUMENTS

| 0 234 590 | 2/1987 | European Pat. Off. . |
| 0 566 300 A1 | 4/1993 | European Pat. Off. . |
| 0 599 243 A2 | 11/1993 | European Pat. Off. ......... H04N 1/40 |
| 0632 642 A1 | 6/1994 | European Pat. Off. ......... H04N 1/40 |
| 5130407 | 9/1993 | Japan . |
| 6152960 | 5/1994 | Japan . |
| 6284269 | 10/1994 | Japan . |
| 7115541 | 2/1995 | Japan . |
| 2172169 | 3/1985 | United Kingdom . |

OTHER PUBLICATIONS

08/209,196, Mar. 10, 1994, Yamanishi, 382 317.

*Primary Examiner*—Kim Vu
*Assistant Examiner*—Tia M. Harris
*Attorney, Agent, or Firm*—Limbach & Limbach, LLP

[57] ABSTRACT

When a frame marked with a marker pen in a black-and-white image is to be extracted, an intermediate-density portion present on a character edge portion is removed by a frame extracting circuit. The frame extracting circuit removes an intermediate-density pixel adjacent to a high-density pixel corresponding to a character/figure. Accordingly, the extracting precision of the marker portion in the black-and-white image is improved. The extracting precision of the marker portion will not be decreased even when extraction is to be performed from an image enlarged by an input system.

8 Claims, 14 Drawing Sheets

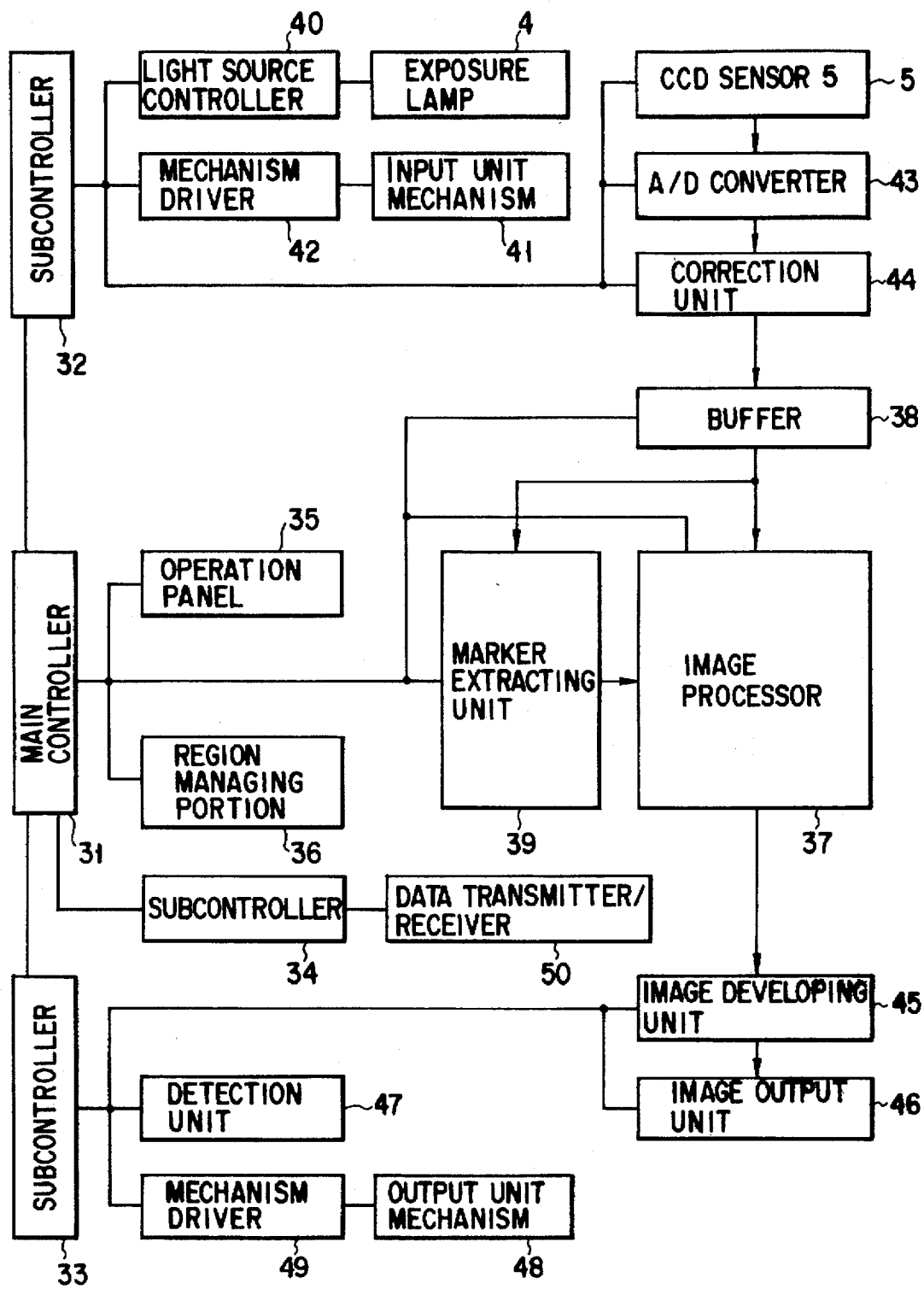
F I G. 2

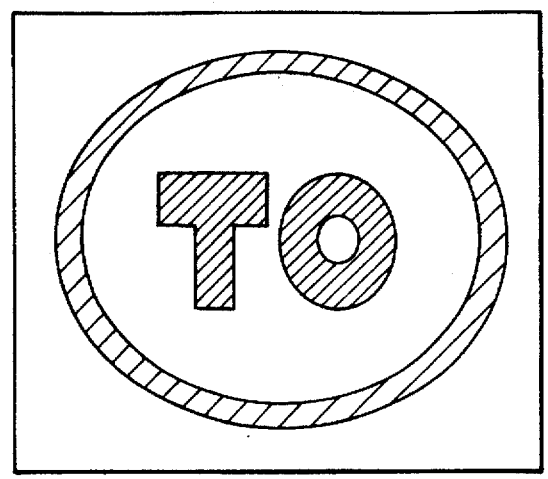
FIG. 7
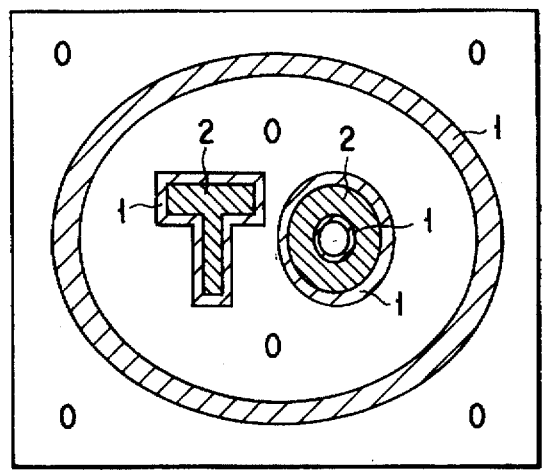
FIG. 8
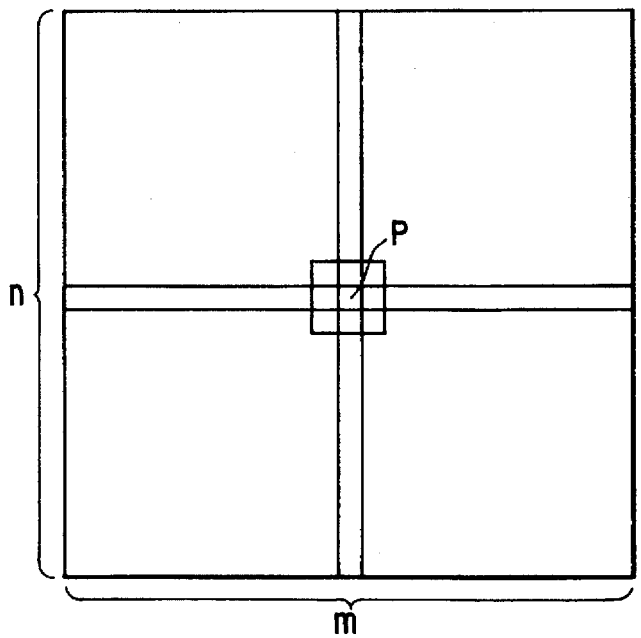
FIG. 9
FIG. 10

MODX = 0

| 0 | 0 | 1 |
|---|---|---|
| 1 | 1 | 0 |
| 0 | 1 | 0 |

FIG. 12A

MODX = 1

| 1 | 1 | 2 |
|---|---|---|
| 2 | 1 | 1 |
| 2 | 1 | 1 |

FIG. 12B

MODX = 2

| 1 | 1 | 1 |
|---|---|---|
| 1 | 1 | 1 |
| 1 | 1 | 1 |

FIG. 12C

MODX = 3

| x | x | x |
|---|---|---|
| x | 1 | x |
| x | x | x |

FIG. 12D

MODX = 0

| 0 | 0 | 0 |
|---|---|---|
| 0 | 1 | 0 |
| 0 | 0 | 0 |

| 1 | 1 | 1 |
|---|---|---|
| 1 | 1 | 1 |
| 0 | 0 | 1 |

| 1 | 1 | 1 |
|---|---|---|
| 1 | 1 | 1 |
| 1 | 1 | 1 |

} OUTPUT : 1

FIG. 15A

| 2 | 2 | 2 |
|---|---|---|
| 1 | 1 | 1 |
| 0 | 0 | 0 |

| 1 | 1 | 1 |
|---|---|---|
| 0 | 0 | 0 |
| 0 | 0 | 0 |

| 1 | 1 | 1 |
|---|---|---|
| 1 | 2 | 1 |
| 1 | 1 | 1 |

| 2 | 1 | 1 |
|---|---|---|
| 1 | 1 | 1 |
| 1 | 1 | 1 |

} OUTPUT : 0

FIG. 15B

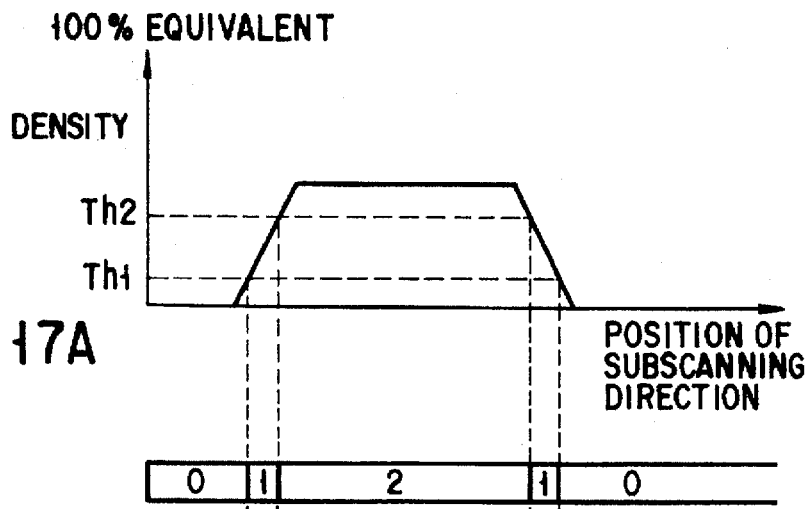
F I G. 17A
F I G. 17B
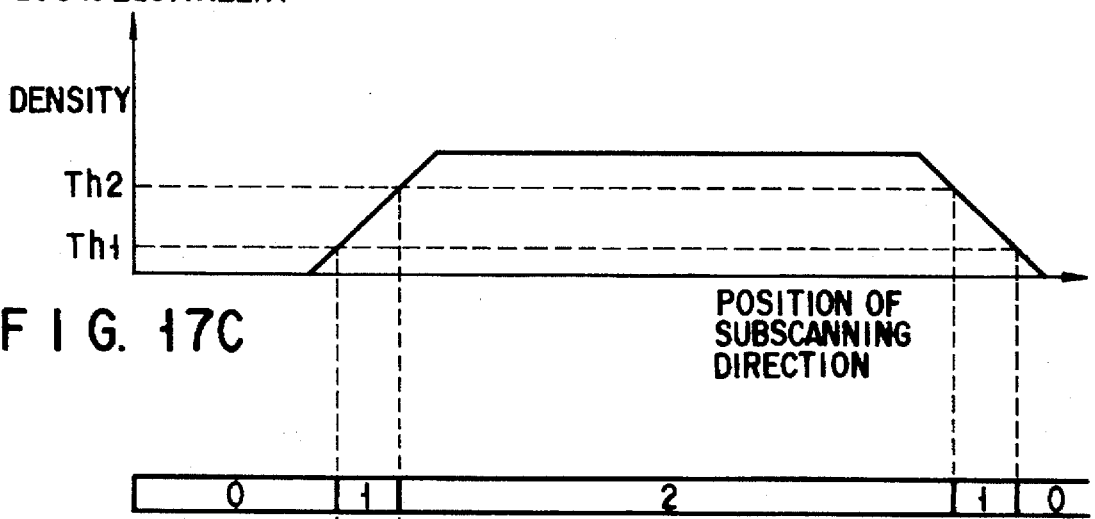
F I G. 17C
F I G. 17D

| 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 1 | 1 | 1 | 1 | 1 | 1 | 1 | 1 | 1 | 1 | 0 | 0 | 0 | 0 | 0 | 0 | 0 | 0 |
| 0 | 0 | 1 | 1 | 1 | 1 | 1 | 1 | 1 | 1 | 1 | 1 | 0 | 0 | 0 | 0 | 0 | 0 | 0 | 0 |
| 0 | 1 | 1 | 0 | 0 | 0 | 0 | 0 | 0 | 0 | 1 | 1 | 1 | 1 | 0 | 0 | 0 | 0 | 0 | 0 |
| 0 | 1 | 1 | 0 | 0 | 0 | 0 | 0 | 0 | 0 | 1 | 1 | 1 | 1 | 0 | 0 | 0 | 0 | 0 | 0 |
| 0 | 1 | 1 | 0 | 0 | 0 | 0 | 0 | 0 | 0 | 0 | 1 | 1 | 1 | 1 | 1 | 0 | 0 | 0 | 0 |
| 0 | 1 | 1 | 0 | 0 | 0 | 0 | 0 | 0 | 0 | 0 | 1 | 1 | 1 | 1 | 1 | 0 | 0 | 0 | 0 |
| 0 | 1 | 0 | 0 | 0 | 0 | 0 | 0 | 0 | 0 | 0 | 0 | 0 | 0 | 1 | 1 | 1 | 1 | 0 | 0 |
| 0 | 1 | 0 | 0 | 0 | 0 | 0 | 0 | 0 | 0 | 0 | 0 | 0 | 0 | 1 | 1 | 1 | 1 | 0 | 0 |
| 0 | 1 | 0 | 1 | 1 | 1 | 1 | 1 | 1 | 1 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 1 | 1 | 1 | 0 | 0 | 0 | 1 | 1 | 0 |
| 0 | 1 | 0 | 1 | 1 | 0 | 0 | 0 | 1 | 1 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 1 | 1 | 1 | 0 |
| 0 | 1 | 0 | 0 | 0 | 0 | 0 | 0 | 0 | 0 | 0 | 1 | 1 | 1 | 0 | 0 | 1 | 1 | 1 | 0 |
| 0 | 1 | 1 | 1 | 0 | 0 | 0 | 0 | 0 | 0 | 0 | 0 | 0 | 0 | 0 | 1 | 1 | 1 | 1 | 0 |
| 0 | 1 | 1 | 1 | 0 | 1 | 1 | 1 | 0 | 0 | 0 | 0 | 0 | 0 | 1 | 1 | 1 | 1 | 1 | 0 |
| 0 | 0 | 1 | 1 | 0 | 0 | 0 | 0 | 0 | 0 | 0 | 0 | 0 | 1 | 1 | 1 | 0 | 0 | 0 | 0 |
| 0 | 0 | 1 | 1 | 0 | 0 | 0 | 0 | 0 | 0 | 0 | 0 | 0 | 1 | 1 | 1 | 0 | 0 | 0 | 0 |
| 0 | 0 | 0 | 1 | 1 | 1 | 1 | 1 | 1 | 1 | 1 | 1 | 1 | 1 | 1 | 0 | 0 | 0 | 0 | 0 |
| 0 | 0 | 0 | 1 | 1 | 1 | 1 | 1 | 1 | 1 | 1 | 1 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |

F I G. 19

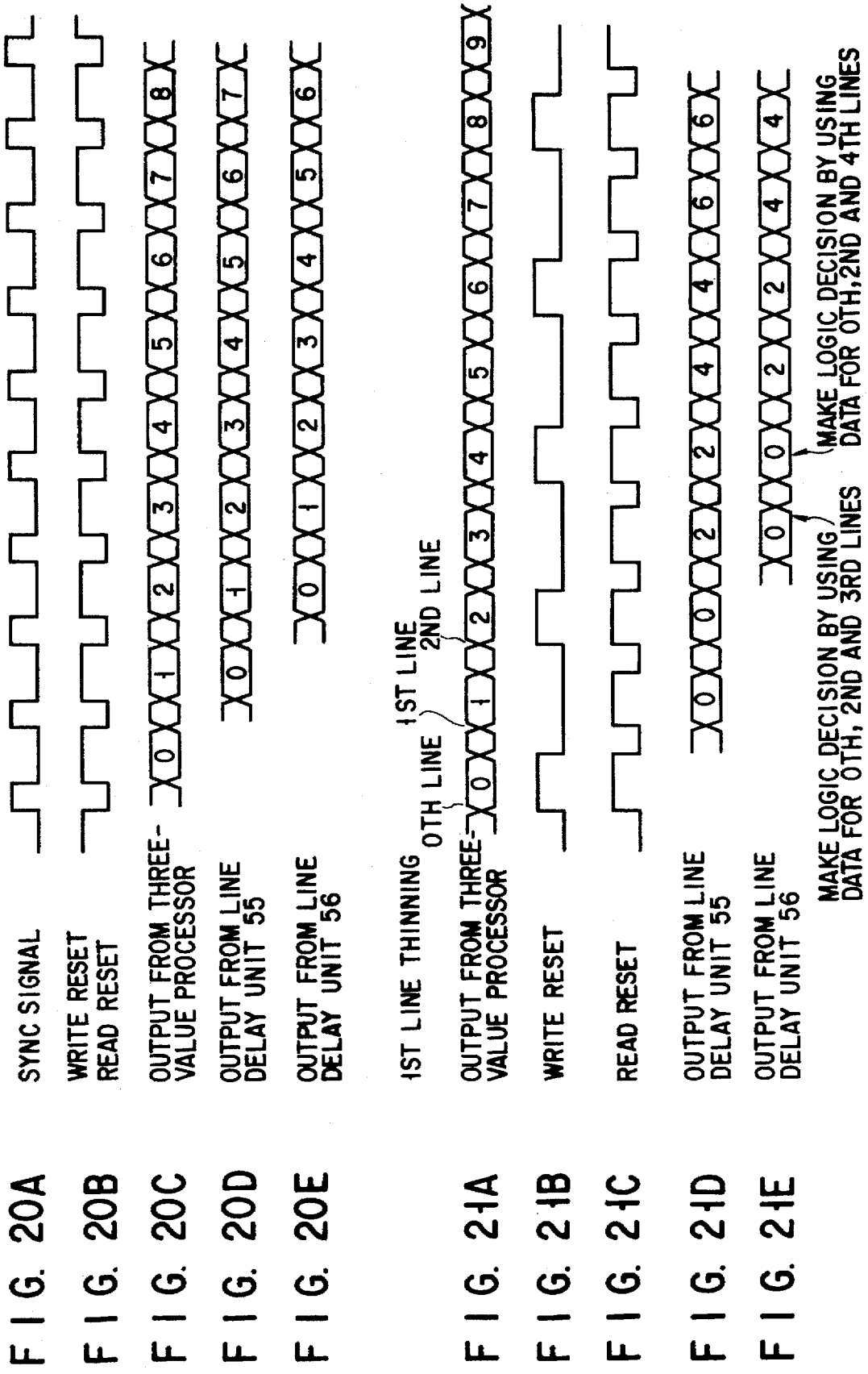

| 0-0 | 0-1 | 0-2 | 0-3 | 0-4 | 0-5 | 0-6 | 0-7 |
|-----|-----|-----|-----|-----|-----|-----|-----|
| 1-0 | 1-1 | 1-2 | 1-3 | 1-4 | 1-5 | 1-6 | 1-7 |
| 2-0 | 2-1 | 2-2 | 2-3 | 2-4 | 2-5 | 2-6 | 2-7 |
| 3-0 | 3-1 | 3-2 | 3-3 | 3-4 | 3-5 | 3-6 | 3-7 |
| 4-0 | 4-1 | 4-2 | 4-3 | 4-4 | 4-5 | 4-6 | 4-7 |
| 5-0 | 5-1 | 5-2 | 5-3 | 5-4 | 5-5 | 5-6 | 5-7 |
| 6-0 | 6-1 | 6-2 | 6-3 | 6-4 | 6-5 | 6-6 | 6-7 |
| 7-0 | 7-1 | 7-2 | 7-3 | 7-4 | 7-5 | 7-6 | 7-7 |

| 0-0 | 0-1 | 0-2 | 0-3 | 0-4 | 0-5 | 0-6 | 0-7 |
|-----|-----|-----|-----|-----|-----|-----|-----|
| 2-0 | 2-1 | 2-2 | 2-3 | 2-4 | 2-5 | 2-6 | 2-7 |
| 4-0 | 4-1 | 4-2 | 4-3 | 4-4 | 4-5 | 4-6 | 4-7 |
| 6-0 | 6-1 | 6-2 | 6-3 | 6-4 | 6-5 | 6-6 | 6-7 |

| 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 1 | 1 | 1 | 1 | 1 | 1 | 1 | 1 | 1 | 1 | 0 | 0 | 0 | 0 | 0 | 0 | 0 | 0 |
| 0 | 0 | 1 | 1 | 1 | 1 | 1 | 1 | 1 | 1 | 1 | 1 | 0 | 0 | 0 | 0 | 0 | 0 | 0 | 0 |
| 0 | 1 | 1 | 0 | 0 | 0 | 0 | 0 | 0 | 0 | 1 | 1 | 1 | 1 | 0 | 0 | 0 | 0 | 0 | 0 |
| 0 | 1 | 1 | 0 | 0 | 0 | 0 | 0 | 0 | 0 | 1 | 1 | 1 | 1 | 0 | 0 | 0 | 0 | 0 | 0 |
| 0 | 1 | 1 | 0 | 0 | 0 | 0 | 0 | 0 | 0 | 0 | 0 | 1 | 1 | 1 | 1 | 0 | 0 | 0 | 0 |
| 0 | 1 | 1 | 0 | 0 | 0 | 0 | 0 | 0 | 0 | 0 | 0 | 1 | 1 | 1 | 1 | 0 | 0 | 0 | 0 |
| 0 | 1 | 0 | 0 | 0 | 0 | 0 | 0 | 0 | 0 | 0 | 0 | 0 | 0 | 1 | 1 | 1 | 1 | 0 | 0 |
| 0 | 1 | 0 | 0 | 0 | 0 | 0 | 0 | 0 | 0 | 0 | 0 | 0 | 0 | 1 | 1 | 1 | 1 | 0 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 0 | 1 | 1 | 0 |
| 0 | 1 | 0 | 0 | 0 | 0 | 0 | 0 | 0 | 0 | 0 | 0 | 0 | 0 | 0 | 0 | 1 | 1 | 1 | 0 |
| 0 | 1 | 0 | 0 | 0 | 0 | 0 | 0 | 0 | 0 | 0 | 0 | 0 | 0 | 0 | 0 | 1 | 1 | 1 | 0 |
| 0 | 1 | 1 | 1 | 0 | 0 | 0 | 0 | 0 | 0 | 0 | 0 | 0 | 0 | 1 | 1 | 1 | 1 | 0 | 0 |
| 0 | 1 | 1 | 1 | 0 | 0 | 0 | 0 | 0 | 0 | 0 | 0 | 0 | 0 | 1 | 1 | 1 | 1 | 0 | 0 |
| 0 | 0 | 1 | 1 | 0 | 0 | 0 | 0 | 0 | 0 | 0 | 0 | 0 | 1 | 1 | 1 | 0 | 0 | 0 | 0 |
| 0 | 0 | 1 | 1 | 0 | 0 | 0 | 0 | 0 | 0 | 0 | 0 | 0 | 1 | 1 | 1 | 0 | 0 | 0 | 0 |
| 0 | 0 | 0 | 1 | 1 | 1 | 1 | 1 | 1 | 1 | 1 | 1 | 1 | 1 | 1 | 0 | 0 | 0 | 0 | 0 |
| 0 | 0 | 0 | 1 | 1 | 1 | 1 | 1 | 1 | 1 | 1 | 1 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |

F I G. 23

IMAGE PROCESSING APPARATUS HAVING IMAGE REGION DESIGNATING FUNCTION

BACKGROUND OF THE INVENTION

1. Field of the Invention

The present invention relates to an image processing apparatus capable of processing an image and, more particularly, to a digital copying machine for identifying a region designated with a marker pen.

2. Description of the Related Art

In a digital copying machine handling a black-and-white binary image (monochrome image), a method is known well with which a black-and-white binary image is marked with a pen having an intermediate density, e.g., a marker pen (a pen having an intermediate density will be referred to as a marker pen hereinafter), thereby designating a region.

According to this method, a black-and-white binary image is marked with a marker pen, and only a portion marked with the marker pen (to be referred to as a marker portion hereinafter) is extracted from the image.

Regarding the condition for region extraction, the density of the background portion of the original is low, the density of the marker portion is higher than that of the background, and the density of the character/figure portion of the original is higher than that of the marker portion. The marker portion is extracted by using this density difference.

To extract a marker portion, a density portion including the density distribution range of the marker portion and sandwiched by two types of binary thresholds is extracted. Thereafter, a noise component, e.g., a character outline, included in the extracted image is removed, thereby extracting a specific marker portion.

More specifically, to designate a region in an image by using a marker portion, a portion marked with a marker pen must be extracted from the original. Usually, to extract a marker portion from image density information by using a single CCD, based on the fact that the marker portion has an intermediate density between the white (background portion) density and the black (character portion) density of the original, two types of binary thresholds th1 and th2 for extracting an intermediate density are prepared, and data existing between the two thresholds th1 and th2 is extracted as an intermediate-density frame (marker portion), as shown in FIG. 4.

At this time, the character edge portion of a high-density portion is extracted as an intermediate-density portion due to the influence of the sampling cycle of the CCD and the blur of the edge portion. As a result, a noise component, e.g., the character edge portion (character outline portion), is undesirably mixed in an image extracted as an intermediate-density portion. With this conventional method, an intermediate-density image, e.g., a character outline portion, other than the marker portion existing on the original is erroneously extracted as a noise component, thus degrading the extracted image.

The influence of the noise component is large in extraction from an image enlarged by an input optical system as well. Accordingly, the extracting precision of a marker portion in a black-and-white binary image is poor, and the extracting precision of a marker portion in an image enlarged by the input system is poor.

SUMMARY OF THE INVENTION

The present invention is directed to remove the drawbacks of the poor extracting precision of the marker portion from a black-and-white binary image and the poor extracting precision of the marker portion from an image enlarged by an input system, and has as its object to provide an image processing apparatus capable of removing the intermediate-density portion of a character edge portion present in the extracted image of a black-and-white binary image, so that the extracting precision of a marker portion in a black-and-white binary image is improved and the extracting precision of a marker portion in an image enlarged by the input system is improved.

In order to achieve the above object, according to one aspect of the present invention, there is provided an image processing apparatus comprising: means for reading an original image as multi-value image data in units of a pixel; means for converting the multi-value image data supplied from the reading means into data corresponding to a high density and an intermediate density; means for preparing a predetermined number of adjacent pixels of data supplied from the converting means, the pixels of one unit including a target pixel; and means for determining that the target pixel is intermediate-density portion data of the original image, when the target pixel has the intermediate-density and the pixels being adjacent to the target pixel do not have the high-density.

According to another aspect of the present invention, there is provided an image processing apparatus comprising: means for scanning an original in a main scanning direction and a subscanning direction perpendicular to the main scanning direction, thereby providing image data corresponding to each pixel in an original image; threshold calculating means for calculating first and second thresholds from the density distribution to change the image data into three-value data on the basis of an image density distribution from the image data provided by the scanning means; three-value processing means for converting multi-value data into three values indicating a high density, an intermediate density, and a low density by using the first and second thresholds; first delaying means for delaying an output from the three-value processing means one line in the subscanning direction; second delaying means for delaying the output from the three-value processing means two lines in the subscanning direction; means for preparing one unit by using a predetermined number of adjacent pixels of data supplied from the converting means, the pixels of one unit including a target pixel; means for determining that the target pixel is intermediate-density portion data of the original image, when the target pixel has the intermediate density and the pixels surrounding the target pixel do not have the high density, by using the output from the three-value processing means and outputs from the first and second delaying means; means for sequentially updating pixels which the preparing means prepares as the unit; and means for discriminating a region surrounded by the intermediate-density portion data determined by the determining means from the image data.

Image data is converted into three-value data corresponding to a high-density portion, an intermediate-density portion, and a low-density portion by the converting means. The three-value data is delayed one line by the first delaying means in the subscanning direction, and is delayed two lines by the second delaying means in the subscanning direction. A target pixel is compared with a pixel adjacent to it by using the output from the three-value processing means and outputs from the first and second delaying means. A portion in which the target pixel is an intermediate-density portion and the pixel adjacent to the target pixel is not a high-density portion is extracted as intermediate-density portion data, and a region indicated by the extracted intermediate-density portion data is identified.

When data are thinned in the write operations of the first and second delaying means, using an image enlarged in the subscanning direction by using the same delaying means, a target pixel is compared with a pixel adjacent to the target pixel. A portion in which the target pixel is an intermediate-density portion and the pixel adjacent to the target pixel is not a high-density portion is extracted as intermediate-density portion data. A region indicated by the extracted intermediate-density portion data is identified.

The intermediate-density portion of a character edge portion present in an image extracted from a black-and-white image is removed, and only a marker portion is extracted. Hence, the extracting precision of the marker in a black-and-white binary image is improved, and the extracting precision of the marker in an image enlarged by an input system is improved greatly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing the arrangement of the control system of a digital copying machine and for explaining one embodiment of the present invention;

FIG. 7 shows image data;

FIG. 8 shows the result of three-value processing;

FIG. 9 shows a detection matrix;

FIG. 10 shows a frame extraction matrix for image data;

FIGS. 12A to 12D show marker portion detection matrices;

FIGS. 15A and 15B show marker portion detection matrices;

FIGS. 17A to 17D show the concept of an enlarged image with respect to a one-to-one image;

FIG. 19 shows frame extraction data;

FIGS. 20A to 20E are timing charts showing read reset and write reset with respect to the read timing of image data in units of lines, and the respective input data of the frame detection unit;

FIGS. 21A to 21E are timing charts showing read reset and write reset with respect to the read timing of image data in units of lines, and the respective input data of the frame detection unit;

FIG. 23 shows frame extraction data.

DETAILED DESCRIPTION OF THE PREFERRED EMBODIMENTS

A preferred embodiment of the present invention will be described with reference to the accompanying drawings.

Figure 1:
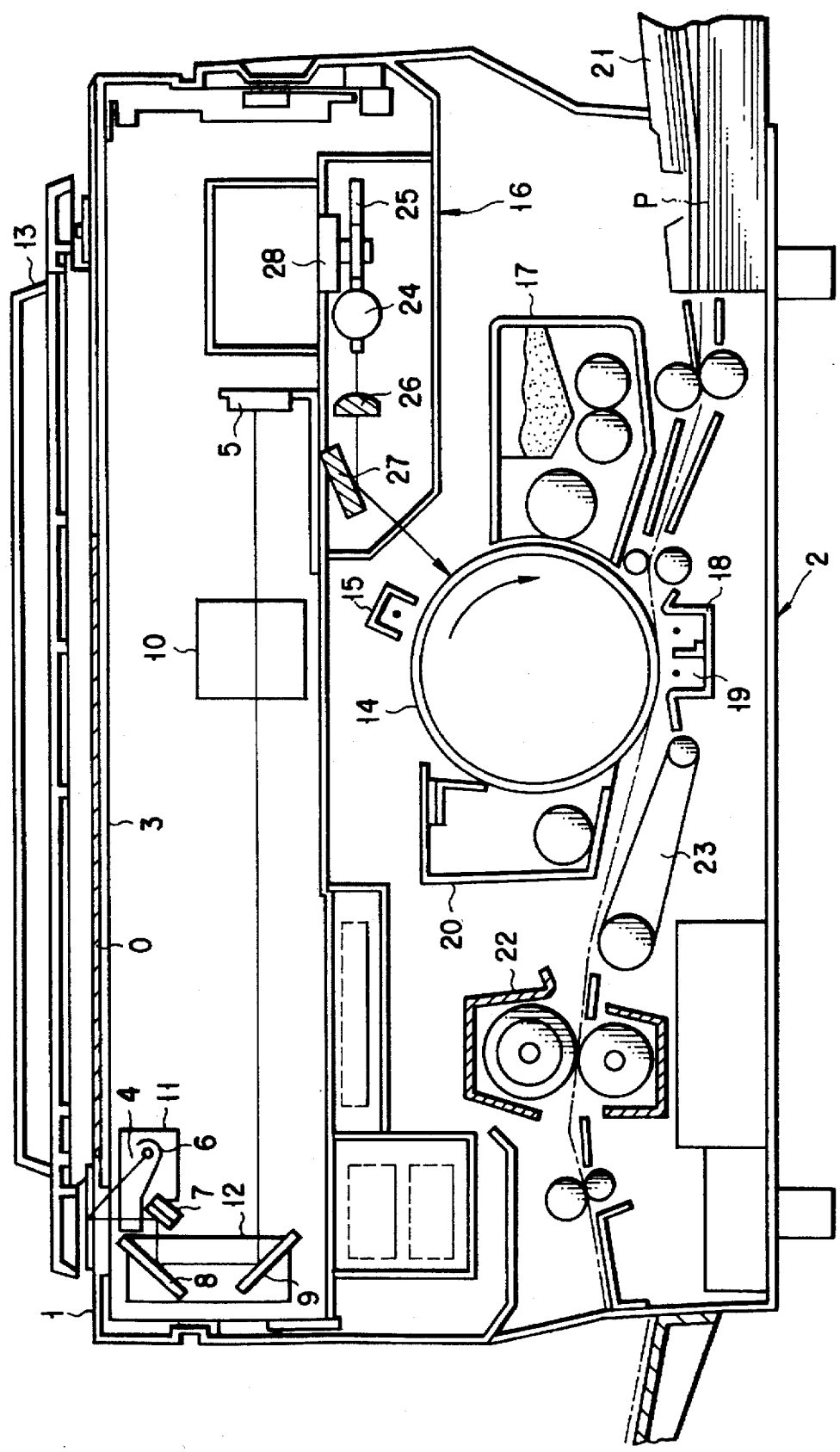
FIG. 1 is a sectional view showing the schematic arrangement of a digital copying machine.

FIG. 1 is a sectional view showing the internal structure of a digital copying machine as an image processing apparatus. The digital copying machine has a scanner portion 1 for optically reading image information on an original O and a printer engine 2 for outputting an image read through the scanner portion 1 onto a recording medium, i.e., copy paper P.

In the scanner portion 1, the original to be copied is placed on an original table 3. The original O placed on the original table 3 is illuminated with a fluorescent or exposure lamp 4 serving as a light source that moves in the subscanning direction. The light beam reflected by the original O illuminated with the exposure lamp 4 is photoelectrically converted by a CCD sensor 5 serving as a photoelectric converting element, so that the image information of the reflected light beam is converted into an image signal. A reflector 6 for efficiently converging the illumination light emerging from the exposure lamp 4 onto the original O is arranged beside the exposure lamp 4. A plurality of mirrors 7, 8, and 9 for bending the optical path of the light beam directed from the original O toward the CCD sensor 5, i.e., the light beam reflected by the original O, a lens 10 for converging the reflected light onto the condensing surface of the CCD sensor 5, and the like are arranged between the exposure lamp 4 and the CCD sensor 5.

An optical system for guiding the light beam emitted from the exposure lamp 4 and reflected by the original O is placed on carriages 11 and 12 and conveyed in the subscanning direction by a pulse motor (not shown). When a region of the original O in the main scanning direction is illuminated with the exposure lamp 4 and the carriages 11 and 12 are moved in the subscanning direction, the regions of the original O in the main scanning direction are sequentially illuminated, so that the entire region of the original O is illuminated with the exposure lamp 4.

An original cover 13 for bringing the original 0 into tight contact with the original table 3 is arranged above the original table 3. As a structure to press the original O, for example, an SDF, i.e., a semi-auto document feeder, or an ADF, i.e., an automatic document feeder, can be employed in accordance with the size of the digital copying machine or the copying capability.

A cylindrical photosensitive drum 14 is provided at the image forming portion serving as the printer engine 2. The photosensitive drum 14 is rotated in a desired direction through a motor (not shown) or the like, and is charged to a desired potential. When a laser beam irradiates the photosensitive drum 14, the potential of a region irradiated with the laser beam is changed, and an electrostatic latent image is formed on the photosensitive drum 14.

A charge unit 15, a laser unit 16, a developing unit 17, a transfer unit 18, and a separation unit 19 are arranged around the photosensitive drum 14. The charge unit 15 gives a desired potential to the photosensitive drum 14. The laser unit 16 outputs to the photosensitive drum 14 a laser beam modulated in accordance with the image information. The developing unit 17 supplies a visualizing agent, i.e., a toner, to the electrostatic latent image formed on the photosensitive drum 14 by the laser beam output from the laser unit 16, thereby developing the electrostatic latent image. The transfer unit 18 transfers a visible toner image on the photosensitive drum 14 which is developed by the developing unit 17 onto a recording medium, i.e., the copy paper P, fed from a recording medium feed portion (to be described later). The separation unit 19 separates the copy paper P from the photosensitive drum 14.

The laser unit 16 is constituted by a semiconductor laser oscillator 24, a polygon mirror 25, an f-θ lens 26, a mirror 27, and a mirror motor 28. The semiconductor laser oscillator 24 generates a laser beam. The polygon mirror 25 changes the laser beam supplied from the semiconductor laser oscillator 24 through a collimator lens (not shown) into beams in units of lines. The f-θ lens 26 changes the laser beams in units of scanning lines supplied from the polygon mirror 25 into parallel light. The mirror 27 reflects the parallel light emerging from the f-θ lens 26 and guides it to the photosensitive drum 14. The mirror motor 28 rotates the polygon mirror 25.

A cleaner unit 20 is arranged on the downstream side of the separation unit 19 in the rotational direction of the photosensitive drum 14. The cleaner unit 20 removes the toner remaining on the surface of the photosensitive drum 14 and erases a change in potential, which is caused on the photosensitive drum 14 by the laser beam, for subsequent image formation.

A recording medium feed portion 21 for feeding copy paper P, on which the toner image formed on the photosensitive drum 14 is to be transferred, toward the transfer unit 18 is arranged between the developing unit 17 and the transfer unit 18. A fixing unit 22 for fixing the toner image on the copy paper P is provided at a position toward which the copy paper P, on which the toner image is transferred by the transfer unit 18, is separated from the photosensitive drum 14. A convey unit 23 for conveying the copy paper P toward the fixing unit 22 is arranged between the fixing unit 22 and the transfer unit 18.

In this digital copying machine, the image is processed by a control system shown in FIG. 2, and image processing control is executed. Referring to FIG. 2, reference numeral 31 denotes a main controller for controlling the overall digital copying machine. Three subcontrollers 32 to 34 for controlling the respective portions are connected to the main controller 31. The main controller 31 is also connected to an operation panel 35, a region managing portion 36, and an image processor 37, to control them. The operation panel 35 designates various types of image processing operations. The region managing portion 36 manages an image processing region. The image processor 37 consists of an image quality improving unit for improving the image quality of the input image, an image editing unit for editing the image, and an image processing unit for processing the image. Furthermore, the main controller 31 is also connected to a buffer 38 for temporarily storing image information, and a marker extracting unit (marker detection unit) 39 for detecting a marker portion.

The subcontroller 32 is connected to a light source controller 40, a mechanism driver 42, an A/D converter 43, and a correction unit 44, to control them. The light source controller 40 controls the light source light intensity of the exposure lamp 4. The mechanism driver 42 controls a mechanical input unit mechanism 41, e.g., a paper feed mechanism, shown in FIG. 1. The A/D converter 43 converts an analog image signal, obtained by conversion through the CCD sensor 5 that detects a reflected light beam and converts it into an image signal, into a digital signal. The correction unit 44 corrects the image signal by, e.g., shading. The light source controller 40 is connected to the exposure lamp 4 serving as the light source, to control the light intensity of the exposure lamp 4. The mechanism driver 42 is connected to the input unit mechanism 41, e.g., a carriage-moving pulse motor, to drive the pulse motor. Accordingly, the entire region of the original O is illuminated with appropriate radiation light.

The subcontroller 33 is connected to an image developing unit 45, an image output unit 46, a detection unit 47, and a mechanism driver 49, to control them. The image developing unit 45 develops an edited or processed image signal for the purpose of image formation, and stores the developed image signal. The image output unit 46 receives an image from the image developing unit 45 and outputs it as a laser modulation signal. The detection unit 47 detects a laser beam output from the semiconductor laser oscillator 24 of the laser unit 16 and adjusts the light intensity of the laser beam. The mechanism driver 49 drives an output unit mechanisms 48 of, e.g., the driving system such as a motor and a solenoid in the laser unit 16.

The subcontroller 34 is connected to a data transmitter/receiver 50 to control data transmission/reception to/from external equipment.

In the digital copying machine described above, the original O is illuminated with the exposure lamp 4. The light beam reflected by the original O is focused on the CCD sensor 5 and is converted into an analog electrical signal. This analog image signal is converted into a digital signal by the A/D converter 43 and supplied to the correction unit 44 for the purpose of shading correction. The image signal subjected to shading correction by the correction unit 44 is temporarily stored in the buffer 38, and is output to the image processor 37 and the marker extracting unit 39.

In the image processor 37, the image quality of the image signal output from the buffer 38 is improved by the image improving unit (not shown). The improved image signal is edited by the image editing unit (not shown) by using marker extraction data supplied from the marker extracting unit 39. The edited image signal is processed by the image processing unit (not shown) and output to the image developing unit 45.

Figure 3:
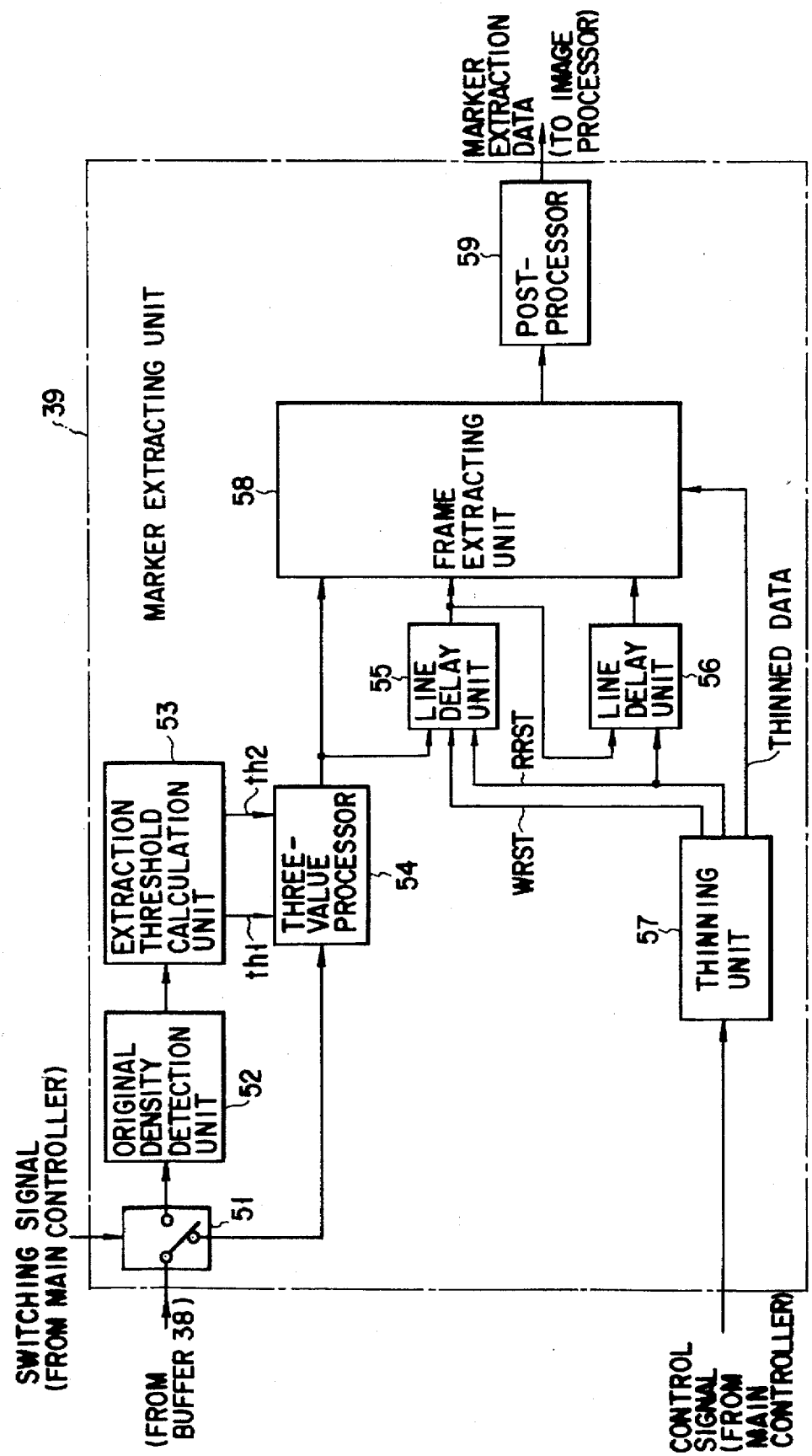
FIG. 3 is a block diagram showing the arrangement of a marker extracting portion.

The marker extracting unit 39 extracts a marker portion from the image signal supplied from the buffer 38. More specifically, the marker extracting unit 39 removes the intermediate-density portion of the character edge portion present in the extracted image and extracts only the marker portion, and is constituted by a switch 51, an original density detection unit 52, an extraction threshold calculation unit 53, a three-value processor 54, line delay units 55 and 56, a thinning unit 57, a frame extracting unit 58, and a post-processor 59, as shown in FIG. 3.

The switch 51 is switched in response to a switching signal supplied from the main controller 31, and outputs the image signal supplied from the buffer 38 to the original density detection unit 52 during pre-scanning and to the three-value processor 54 during copying.

The original density detection unit 52 detects the density data of the original from the image signal supplied from the buffer 38 through the switch 51. The detection result is output to the extraction threshold calculation unit 53.

The extraction threshold calculation unit 53 calculates two types of thresholds, used for performing three-value processing, based on data supplied from the original density detection unit 52. The calculated thresholds are output to the three-value processor 54.

The three-value processor 54 changes the image signal supplied from the buffer 38 through the switch 51 into three-value data by using the two types of thresholds supplied from the extraction threshold calculation unit 53. The three-value data is output to the frame extracting unit 58 and the line delay unit 55.

The line delay unit 55 delays the three-value data supplied from the three-value processor 54 one scanning line. The line-delayed data is output to the line delay unit 56 and the frame extracting unit 58.

The line delay unit 56 delays data supplied from the line delay unit 55 one scanning line. More specifically, the three-value data supplied from the three-value processor 54 is delayed two lines in the subscanning direction, and this line-delayed data is output to the frame extracting unit 58.

The thinning unit 57 thins data in the write operations of the line delay units 55 and 56 in response to a control signal supplied from the main controller 31, thereby thinning the input data during frame extraction. The thinning unit 57 outputs thinned data, write reset WRST, and read reset RRST in response to the control signal. The write reset RWST and the read reset RRST are output to the line delay units 55 and 56, and the thinned data is output to the frame extracting unit 58.

The frame extracting unit 58 extracts an intermediate-density frame present in the image data in accordance with an extraction algorithm by using the three-value data which is supplied from the three-value processor 54, the three-value data which is supplied from the line delay unit 55 and which has been changed to three-value data preceding to the current data by one line, and the three-value data which is supplied from the line delay unit 56 and which has been changed to three-value data preceding to the current data by two lines. The frame extraction data is output to the post-processor 59.

The post-processor 59 removes a noise component included in the extracted marker signal and performs expansion processing for restoring the image from which the noise component has been removed to the original size.

The marker extracting unit 39 will be described in detail.

To extract a marker portion from an original O having a designated region marked with a marker pen, the background density of the original O and the character density of the original O are read in advance by the CCD sensor 5 (in accordance with pre-scanning or the like), and the background density data and the character density data used for marker portion extraction are determined.

Figure 4:
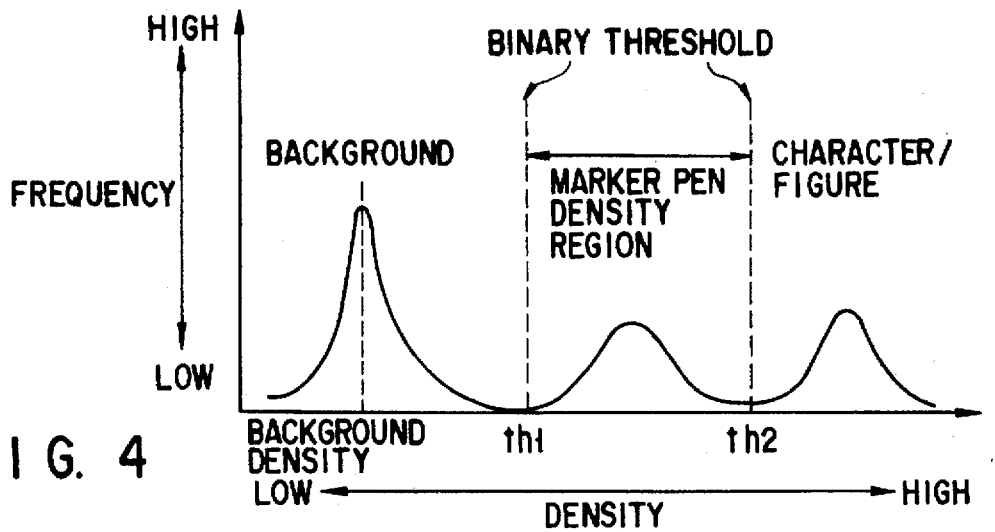
FIG. 4 shows the concept of the frequency with respect to the density of an original.

The background density and the character density of the original O are detected by the original density detection unit 52. During pre-scanning, the original image data read by the CCD sensor 5 is output to the original density detection unit 52 through the switch 51. Usually, the density distribution of a black-and-white image has three peaks, as shown in FIG. 4 showing the concept of the frequency with respect to the density of the original O.

The background density of the original O is distributed at comparatively low densities in the entire detection density range. The density of a character/figure is distributed at comparatively high densities. The intermediate-density range between the background density and the character/figure density is the density range of the marker portion. By utilizing this feature, the background density and the character density are determined from the relationship between the density and the frequency in the effective image area range after the start of pre-scanning and before the end of pre-scanning.

The original density detection unit 52 determines the density distribution from the image density read from the buffer 38, calculates the background density and the character density, and outputs the calculated densities to the following extraction threshold calculation unit 53. The extraction threshold calculation unit 53 calculates the extraction binary thresholds th1 and th2 used for the purpose of marker portion extraction based on the background density and the character density supplied from the original density detection unit 52.

When the marker portion marked on the original O is read by the CCD sensor 5, the density of the read marker portion is approximately expressed by a following equation:

(density of read marker portion)=(background density of original O)+(density of pure marker portion)

Hence, when the background density of the original O and the density of the pure marker portion of the marker portion alone are obtained, the extraction density range of the marker portion of the actual original O can be calculated.

Figure 5:
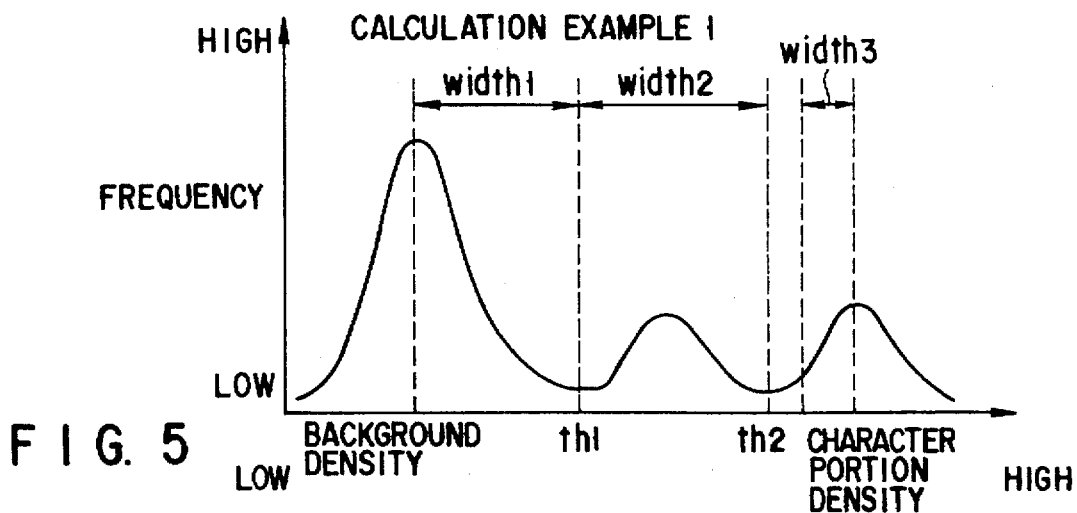
FIG. 5 shows the concept of the frequency with respect to the density of an original.
Figure 6:
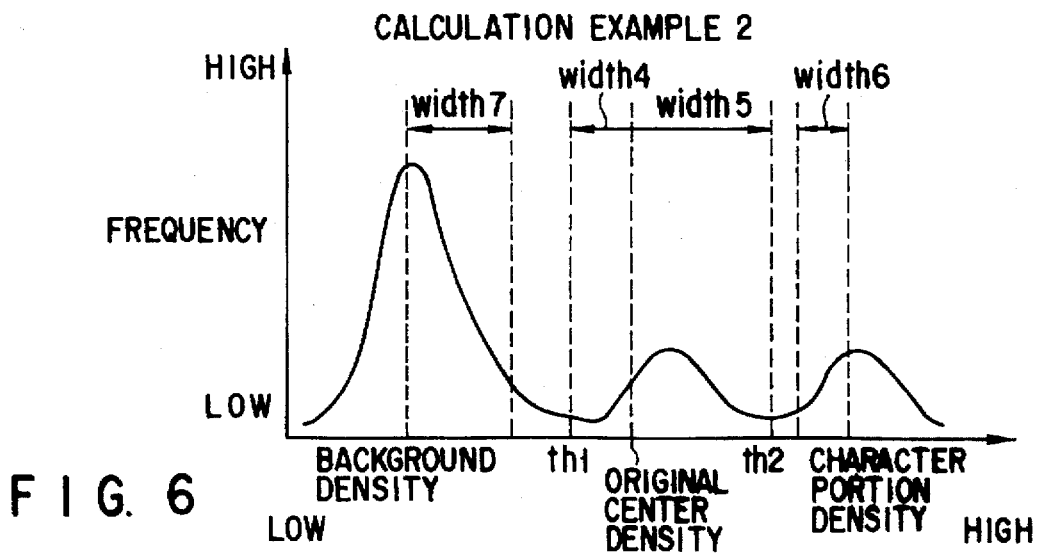
FIG. 6 shows the concept of the frequency with respect to the density of an original.

When the background density of the original is high, the high-density portion of the read marker portion may overlap the character portion, causing erroneous extraction of the marker portion. Thus, an algorithm that cancels a density portion overlapping the character portion is added to the extraction threshold calculation unit 53. FIGS. 5 and 6 show the concepts of calculation of the extraction thresholds.

In Calculation Example (1) of FIG. 5, the calculation equations for marker portion extraction are:

th1=(background density)+width1 th2=(background density)+width1+width2

If th2>(character portion density)−width3, th2=(character portion density)−width3.

Width1 to width3 are fixed values obtained by experiments and represent width1: the density difference between the background and the low-density portion of the marker portion width2: the width of the marker portion extraction range width3: the density difference between the character and the high-density portion of the marker portion In Calculation Example (2) of FIG. 6, the calculation equations for marker portion extraction are as follows. In practice, this calculation scheme is most popular. More specifically, th1={(background density)+(character portion density)}/2−width4 th2={(background density)+(character portion density)}/2+width5

If th2>character portion density, th2=(character portion density)−width6, and when th1>background density, th1=(background density)+width7.

Width4 to width7 are fixed values obtained by experiments and represent width4: the density difference between the original center and the low-density portion of the marker portion width5: the density difference between the original center and the high-density portion of the marker portion width6: the density difference between the character and the high-density portion of the marker portion width7: the density difference between the background and the low-density portion of the marker portion Regarding the density of the pure marker portion, a value measured in advance is set as a parameter. The thresholds th1 and th2 that are calculated by the extraction threshold calculation unit 53 in this manner are output to the three-value processor 54. The three-value processor 54 performs three-value processing of the original read data supplied from the switch 51 by using the thresholds th1 an th2 supplied from the extraction threshold calculation unit 53. Regarding the three-value data, the background portion is defined as 0, the density range of the marker portion is defined as 1, and the high-density portion is defined as 2. The data is changed to three-value data in accordance with this definition. The relationship between the thresholds th1 and th2 of three-value processing and input image data is as follows:

*Background density range:

when input image data <th1, the output is 0.

*Marker portion signal density range:

when th1≦(input image data)<th2, the output is 1.

*High-density portion (character portion):

when input image data ≧th2, the output is 2.

The image data is changed to three-value data in accordance with the above processing operations.

For example, when image data as shown in FIG. 7 is subjected to three-value processing, the background portion (blank portion) becomes 0, the intermediate-density frame and the character edge portion (hatched with leftwardly downward lines) become 1, and the high-density portion (hatched with rightwardly downward lines) of the character portion becomes 2, as shown in FIG. 8.

In this manner, an intermediate-density portion exists on the intermediate-density frame portion as well as on the edge portion of the high-density portion (character portion). Hence, a logic circuit is provided and frame extraction is performed. With this logic circuit, detection is performed as to whether or not a high-density portion is present in a detection matrix (to be described later). If a high-density portion exists in the detection matrix, even if its target pixel has an intermediate density, this portion is not extracted as an intermediate-density frame. The three-value data is output to the frame extracting unit 58 and the line delay unit 55.

The line delay unit 55 is constituted by a FIFO and the like, and outputs data, obtained by delaying one line the three-value data supplied from the three-value processor 54, to the line delay unit 56 and the frame extracting unit 58. The line delay unit 56 is also constituted by a FIFO and the like, and outputs data, obtained by delaying two lines the three-value data supplied from the three-value processor 54, to the frame extracting unit 58.

Hence, the frame extracting unit 58 defines an (m×n) extraction matrix and extracts an intermediate-density frame by using a feature amount in this matrix. More specifically, the frame extracting unit 58 extracts an intermediate-density frame based on pixel data present in the matrix.

In this embodiment, an extraction case in which a 3×3 detection matrix as shown in FIG. 9 is used will be described. As shown in FIG. 10, a frame extraction matrix is defined for image data which has been subjected to three-value processing. The detection matrix is formed by delaying, in the subscanning direction, a pixel which has been subjected to three-value processing by using an external memory, e.g., an SRAM or a FIFO, and an FF circuit serving as a register.

Figures 11, 16:
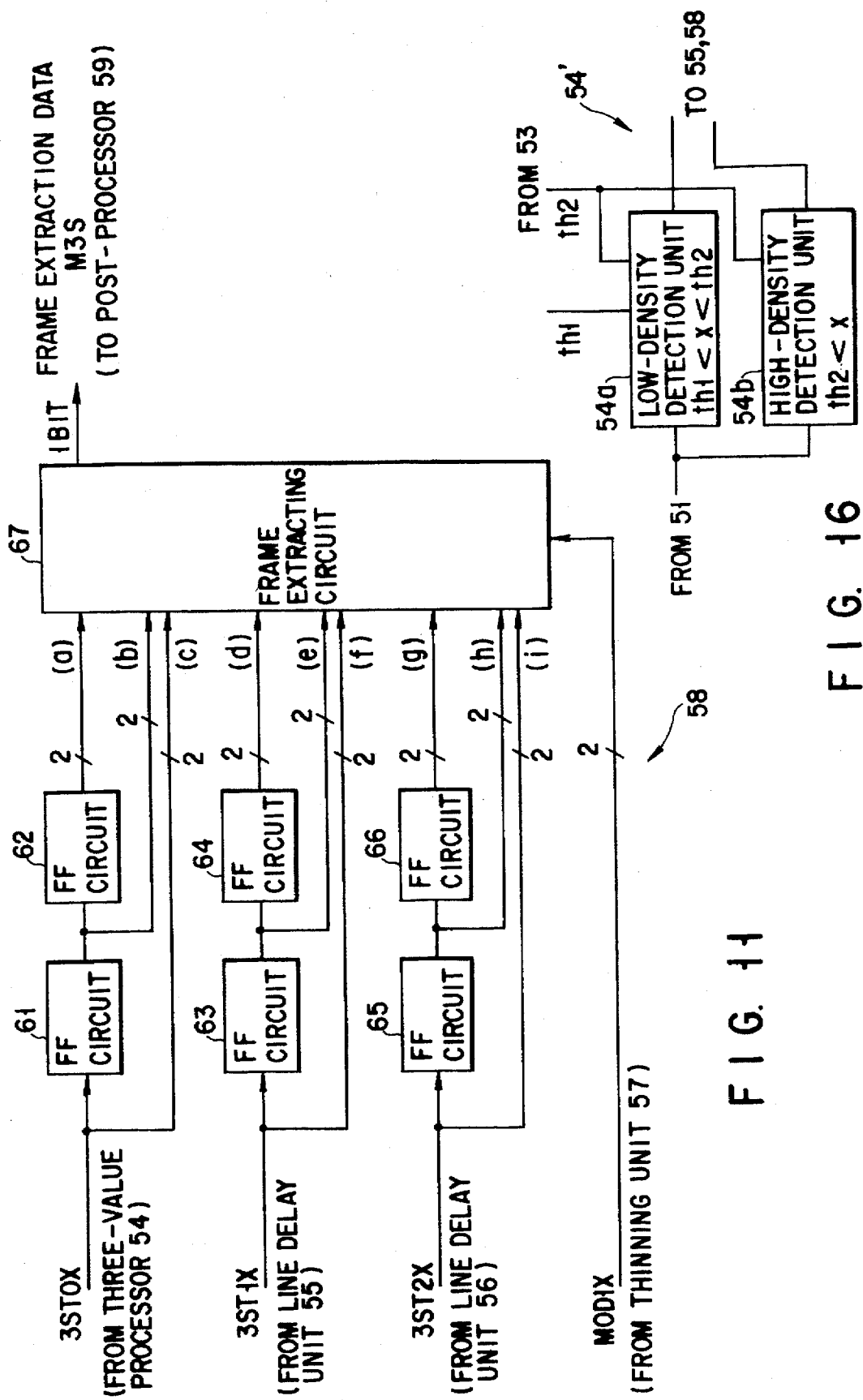
FIG. 11 is a block diagram showing the schematic arrangement of a frame detection unit.
FIG. 16 shows an example of a three-value processor shown in FIG. 3.

The frame extracting unit 58 is constituted by, e.g., two-stage FF (flip-flop) circuits 61 and 62, two-stage FF circuits 63 and 64, two-stage FF circuits 65 and 66, and a frame extracting circuit 67, as shown in FIG. 11. The FF circuits 61 and 62 shift an output (3ST0X) supplied from the three-value processor 54. The FF circuits 63 and 64 shift an output (3ST1X) supplied from the line delay unit 55. The FF circuits 65 and 66 shift an output (3ST2X) supplied from the line delay unit 56.

The frame extracting circuit 67 is supplied with data (each having 2 bits) of the respective bits a to i constituting the above detection matrix (see FIG. 9). For example, a set output from the FF circuit 62 is supplied to the frame extracting circuit 67 as data a. A set output from the FF circuit 61 is supplied to the frame extracting circuit 67 as data b. An output (3ST0X) from the three-value processor 54 is supplied to the frame extracting circuit 67 as data c. A set output from the FF circuit 64 is supplied to the frame extracting circuit 67 as data d. A set output from the FF circuit 63 is supplied to the frame extracting circuit 67 as data e. An output (3ST1X) from the line delay unit 55 is supplied to the frame extracting circuit 67 as data f. An output from the line delay unit 55 is supplied to the frame extracting circuit 67 as data g. A set output from the FF circuit 65 is supplied to the frame extracting circuit 67 as data h. An output (3ST1X) from the line delay unit 56 is supplied to the frame extracting circuit 67 as data i.

The frame extracting circuit 67 is also supplied with 0 to 3 as thinned data (MOD1X) from the thinning unit 57. The thinned data corresponds to the copying magnification. For example, when the magnification is 500% or more, 2 is output.

As shown in FIG. 12A, when the thinned data MODX is 0, if the target pixel (e)=1, and 2 is not present in the matrix, the frame extracting circuit 67 outputs 1 as frame extraction data MS3; otherwise, 0 as frame extraction data MS3. As shown in FIG. 12B, when the thinned data MODX is 1, if the target pixel (e)=1, and 0 is not present in the matrix, the frame extracting circuit 67 outputs 1 as the frame extraction data M3S; otherwise, 0 as the frame extraction data M3S. As shown in FIG. 12C, when the thinned data MODX is 2, if the target pixel (e)=1, and 0 and 2 are not present in the matrix, i.e., if all the pixels in the matrix are 1s, the frame extracting circuit 67 outputs 1 as the frame extraction data M3S; otherwise, 0 as the frame extraction data M3S. As shown in FIG. 12D, when the thinned data is 3, if the pixel of interest (e)=1, the frame extracting circuit 67 outputs 1 as the frame extraction data M3S; otherwise, 0 as the frame extraction data M3S.

Figures 13, 14:
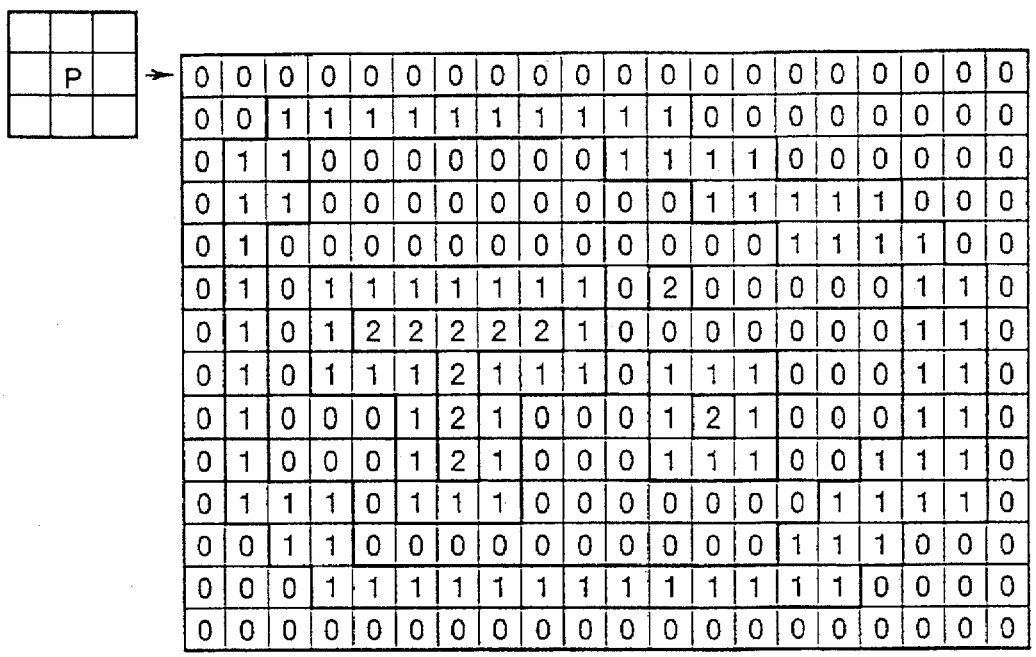
FIG. 13 shows a three-value output.
FIG. 14 shows frame extraction data.

A processing example of the frame extracting unit 58 in the above arrangement will be described with reference to FIGS. 13 and 14. Assume that 0 is supplied from the thinning unit 57 as the thinned data (MOD1X). For example, when the three-value output has pixel data as shown in FIG. 13, extraction is performed by using a 3×3 detection matrix, so that frame extraction data as shown in FIG. 14 is output.

This will be described in detail. As shown in FIG. 15A, when the target pixel (e)=1, and other pixels in the matrix are 0s, are 1s and 0s, or 1s, the frame extracting circuit 67 outputs 1 as the frame extraction data M3S. As shown in FIG. 15B, when the target pixel (e)=1, and other pixels in the matrix are 0s and 2s, when the target pixel (e)=0, and other pixels in the matrix are 1s and 0s, when the target pixel (e)=2, and other pixels in the matrix are is, and when the target pixel (e)=1, and other pixels in the matrix are 1s and 2s, the frame extracting circuit 67 outputs 0 as the frame extraction data M3S. Thus, an intermediate-density component present on the edge of (or around) a high-density portion (character portion) can be removed by detecting an intermediate-density portion adjacent to a high-density portion by using a detection matrix.

After being subjected to frame extraction by the frame extracting unit 58, a signal is subjected to noise component removal and expansion processing by the post-processor 59, is extracted as marker portion extraction data of an intermediate-density frame, and is output to the image processor 37. The image processor 37 includes erasure of the marker portion data extracted from the image data.

Other than the above circuit configuration, another circuit configuration is possible with which three-value processing is not performed or image data is processed after it is divided into a character portion and an intermediate-density portion. For example, as shown in FIG. 16, an intermediate-density portion and a high-density portion may be detected by using two types of binary processors 54a and 54b, in place of the three-value processor 54 in FIG. 3, and an intermediate-density frame may be detected from the detection results of the high-density portion and the intermediate-density portion.

When a circuit for thinning scanning lines is provided to the intermediate-density frame extracting circuit of the present invention, the frame extracting precision of an image enlarged by the input system in the subscanning direction can be improved. This will be described below.

FIGS. 17A and 17B show the concept of the density distribution in the subscanning direction of a one-to-one (100%) image, and FIGS. 17C and 17D show the concept of the density distribution of an image which is enlarged two times (200%) in the subscanning direction. As is apparent from FIGS. 17A to 17D, the range extracted as an intermediate-density portion is larger in the 200% image than in the 100% image.

Figure 18:
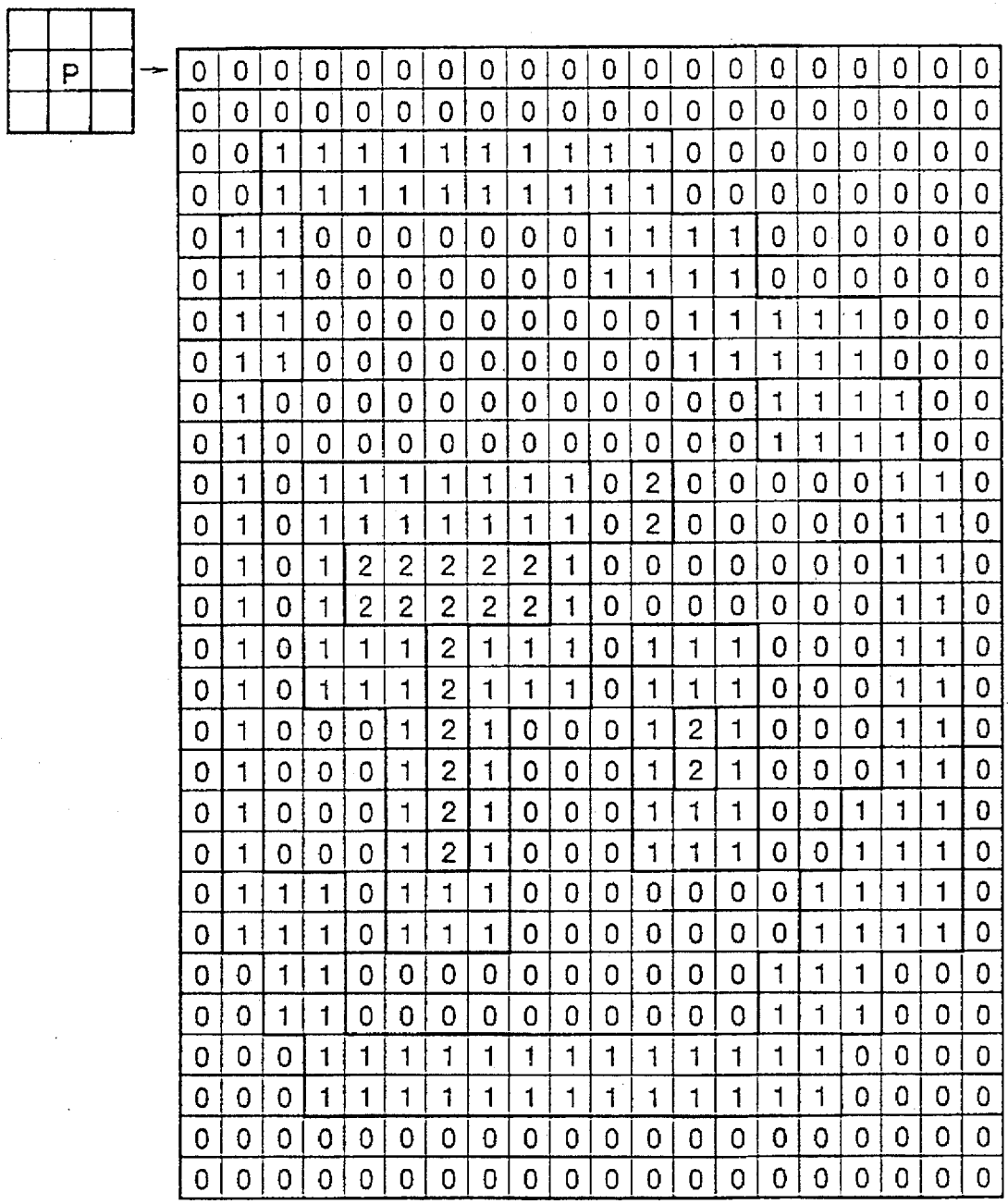
FIG. 18 shows a three-value output.

At this time, when the three-value output has pixel data as shown in FIG. 18, if extraction is performed as in FIGS. 15A and 15B by using a 3×3 detection matrix, frame detection data as shown in FIG. 19 is output.

In this manner, in an image enlarged by the input system in the subscanning direction, since the intermediate-density portion of the image is increased, a character edge portion can be erroneously extracted. In order to prevent this erroneous extraction, the number of detection matrix circuits in the subscanning direction must be increased, resulting in a necessity for a subscanning memory.

In the present invention, a thinning circuit for the subscanning direction is provided, so that a processing circuit capable of performing accurate frame extraction even from an enlarged image without increasing the memory size can be obtained.

This operation will be described with reference to the timing charts shown in FIGS. 20A to 20E and FIGS. 21A to 21E. When thinning is not performed in the subscanning direction, write reset WRST and read reset RRST as shown in FIG. 20B are supplied from the thinning unit 57 to the line delay units 55 and 56 at an output timing of each scanning line of the three-value processor 54 as shown in FIG. 20A.

As a result, the three-value processor 54 outputs image data in units of scanning lines, as shown in FIG. 20C, the line delay unit 55 outputs data obtained by delaying the data output from the three-value processor 54 one line in the subscanning direction, as shown in FIG. 20D, and the line delay unit 56 outputs data obtained by delaying the data output from the three-value processor 54 two lines in the subscanning direction, as shown in FIG. 20E.

When data is thinned every other scanning line, the thinning unit 57 supplies write reset WRST for every other line as shown in FIG. 21B and read reset RRST in units of lines as shown in FIG. 21C to the line delay units 55 and 56 in synchronism with the output timing in units of lines of the three-value processor 54 shown in FIG. 21A. Hence, the line delay unit 55 generates outputs from the three-value processor 54 on every other line twice for two lines, as shown in FIG. 21D. The line delay unit 56 generates the output from the line delay unit 55 with a delay of two lines in the subscanning direction, as shown in FIG. 21E.

Figure 22A:
FIGS. 22A and 22B show data to be input to the frame extraction unit.
Figure 22B:

With the above operation, the data input to the frame extracting unit 58 can be converted into an apparent 100%-equivalent image signal. As shown in FIGS. 22A and 22B, data to be input to the frame extracting unit 58 is thinned in the subscanning direction to have discrete values (a 100%-equivalent signal).

Therefore, even if the image is enlarged in the subscanning direction, a 100%-equivalent signal is input to the frame extracting unit 58 during frame extraction, and during output, continuous frame extraction data matching the magnification of the image is output. More specifically, the 200%-equivalent image shown in FIG. 18 is converted into an apparent 100%-equivalent image as shown in FIG. 13. Frame extraction is preformed by using this converted image, and frame extraction data as shown in FIG. 14 is obtained. When this data is enlarged, frame extraction data as shown in FIG. 23 can be obtained.

As has been described above, according to the present invention, there is provided an image processing apparatus in which, in extraction of a marker portion of a black-and-white image, an intermediate-density portion present on a character edge portion can be removed, thus improving the marker portion extracting precision, and in which the marker portion extracting precision will not be decreased even when extraction is performed from an enlarged image.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus comprising:

means for reading an original image as multi-value image data in units of a pixel;

means for converting the multi-value image data supplied from said reading means into data corresponding to a high density and an intermediate density;

means for preparing a predetermined number of adjacent pixels of data supplied from said converting means, the pixels of one unit including a target pixel;

first determining means for determining that the target pixel is an intermediate-density pixel positioned within an intermediate-density portion in the original image, when the target pixel has intermediate density and pixels adjacent to the target pixel do not have high density; and second determining means for determining that the target pixel is an intermediate-density pixel positioned in an edge portion of the original image having high density, when the target pixel has intermediate density and the pixels adjacent to the target pixel have high density.

2. An apparatus according to claim 1, further comprising:

means for sequentially updating pixels which the preparing means prepares as the unit, and means for identifying a region surrounded by the intermediate-density portion determined by the determining means.

3. An apparatus according to claim 2, wherein said updating means includes means for thinning data supplied from said converting means.

4. An apparatus according to claim 2, wherein said reading means has means for enlarging the original image with a predetermined magnification, and said updating means includes means for thinning data supplied from said converting means in accordance with the predetermined enlarging magnification, and means for constituting one unit by using the predetermined number of pixels of data thinned by said thinning means.

5. An image processing method comprising the steps of:

reading an original image as multi-value image data in units of a pixel;

converting the multi-value image data into data corresponding to a high density and an intermediate density;

preparing by using one unit a predetermined number of adjacent pixels of data obtained from said converting step, the pixels of one unit including a target pixel;

determining that the target pixel is an intermediate-density pixel positioned within an intermediate-density portion in the original image, when the target pixel has intermediate density and pixels adjacent to the target pixel do not have high density; and determining that the target pixel is an intermediate-density pixel positioned in an edge portion of the original image having high density, when the target pixel has intermediate density and the pixels adjacent to the target pixel have high density.

6. An image processing apparatus comprising:

means for scanning an original in a main scanning direction and a subscanning direction perpendicular to the main scanning direction, thereby providing image data corresponding to each pixel in an original image;

threshold calculating means for determining an image density distribution, based on the image data provided by said scanning means, and calculating first and second thresholds from the density distribution to be used to transform the image data into three-value data, said threshold calculating means having means for detecting an image background density from the density distribution, and setting a value which is larger than the image background density by a first predetermined value as the first threshold and a value which is larger than the first threshold by a second predetermined value as the second threshold;

three-value processing means for converting multi-value data into three values representing a high density, an intermediate density and a low density, using the first and second thresholds;

first delaying means for delaying an output from said three-value processing means for a time corresponding to one line in the subscanning direction;

second delaying means for delaying the output from said three-value processing means for a time corresponding to two lines in the subscanning direction;

means for determining that the target pixel is an intermediate-density pixel positioned within an intermediate-density portion of the original image, when the target pixel has intermediate density and the pixels surrounding the target pixel do not have high density, using the output from said three-value processing means and outputs from said first and second delaying means; and means for discriminating the image data from a region surrounded by the intermediate-density pixel determined by the determining means.

7. An image processing apparatus comprising:

means for scanning an original in a main scanning direction and a subscanning direction perpendicular to the main scanning direction, thereby providing image data corresponding to each pixel in an original image;

threshold calculating means for determining an image density distribution, based on the image data provided by said scanning means, and calculating first and second threshold from the density distribution to be used to transform the image data into three-value data, said threshold calculating means having means for detecting an image background density and a character density from the density distribution, and setting a value which is smaller than a central density between the background density and the character density by a first predetermined value as the first threshold and a value which is larger than the central density by a second predetermined value as the second threshold;

three-value processing means for converting multi-value data into three values representing a high density, an intermediate density and a low density, using the first and second thresholds;

first delaying means for delaying an output from said three-value processing means for a time corresponding to one line in the subscanning direction;

second delaying means for delaying the output from said three-value processing means for a time corresponding to two lines in the subscanning direction;

means for determining that the target pixel is intermediate-density pixel positioned in an intermediate-density portion of the original image, when the target pixel has intermediate density and the pixels surrounding the target pixel do not have high density, using the output from said three-value processing means and outputs from said first and second delaying means; and means for discriminating the image data from a region surrounded by the intermediate-density pixel determined by the determining means.

8. An image processing apparatus according to claim 7, wherein said determining means has means for forming a matrix by using the output from the three-value processing means and the outputs from said first and second delaying means as elements, defining a central element of the matrix as the target pixel, and determining whether or not the target pixel is an intermediate-density pixel based on values of the target pixel and eight surrounding elements.

* * * * *